INVENTOR.
James Nelson Hinde,
BY
Cromwell, Greist & Warden
ATTYS.

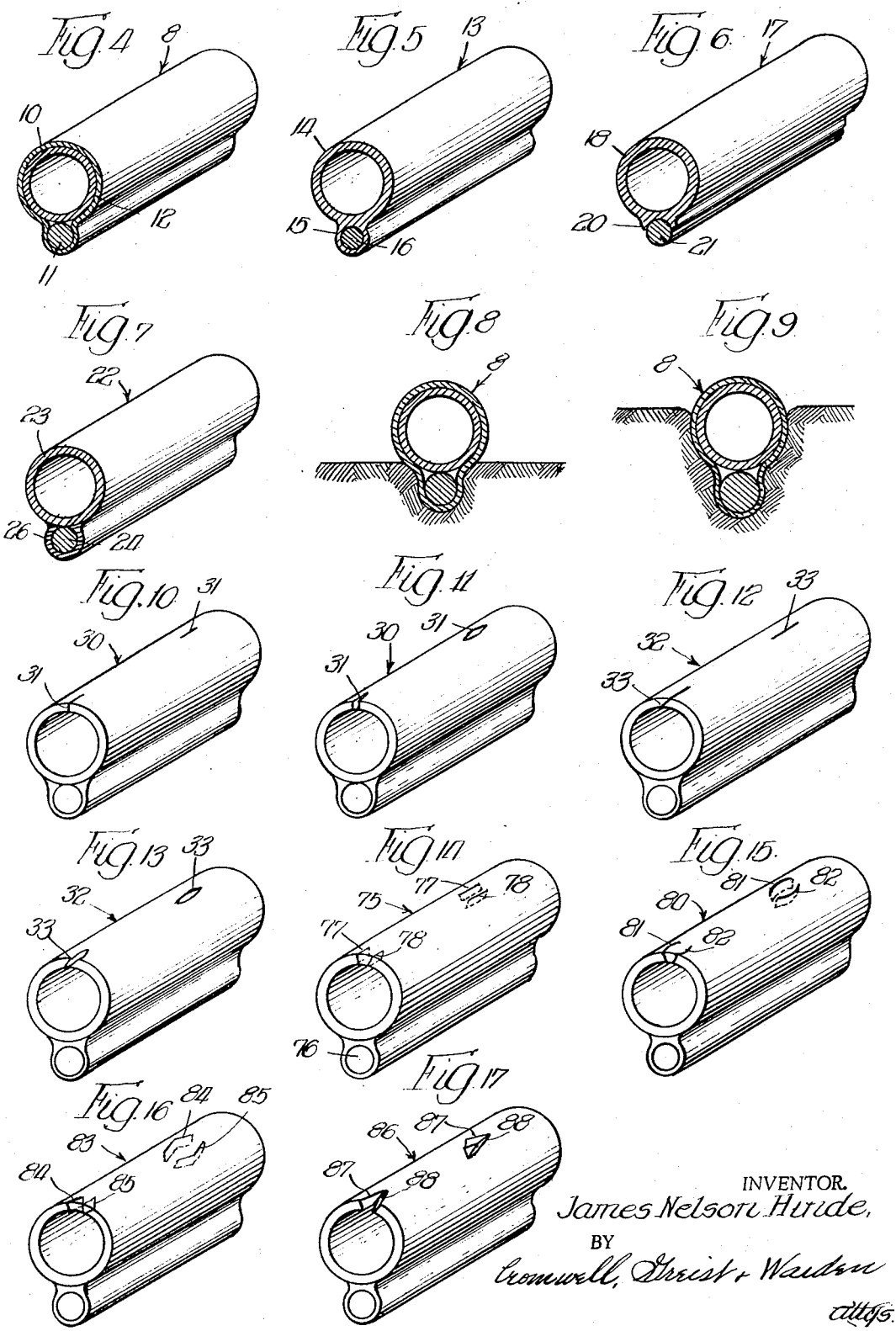

United States Patent Office 3,293,861
Patented Dec. 27, 1966

3,293,861
METHOD OF DISTRIBUTING FLUIDS IN BODIES OF LIQUID AND APPARATUS THEREFOR
James Nelson Hinde, 224 Linden Park Place, Highland Park, Ill. 60035
Filed Nov. 13, 1961, Ser. No. 151,819
2 Claims. (Cl. 61—1)

This invention relates, generally, to innovations and improvements in distributing or dispersing fluids into bodies of liquid for various purposes. An important feature of the invention is to give the liquid an upward flow rate, either laminar or turbulent, in a pre-determined pattern in a large body of liquid. It also relates to the apparatus and equipment for effecting such distribution or dispersion, particularly, to the flexible, weighted tubing by means of which the direct release of the fluid into the body of liquid is accomplished.

In most uses of the invention, the distributed or dispersed fluid will be air and the body of liquid will be a body of water, e.g. pond, lake, reservoir, river, swimming pool, aeration pond, sewage or industrial waste treatment tanks, waste stabilization ponds, etc. However, other gases and liquids, including various mixtures thereof, may be distributed or dispersed into various bodies of liquid. For example, an industrial application would be the submerged distribution of oxygen into a body of liquid undergoing aerobic fermentation. Other specific uses of the invention include distribution of weed killer in various bodies of water and the introduction of chemicals into waste stabilization ponds.

Among the more important uses or application of my invention are: (1) aeration of bodies of water, to prevent fish-kill in summer and winter and promote the growth of aquatic animals and fish life, and, to speed up the removal of organic matter, gases and oxidizable mineral matter from water; (2) ice-melting, to prevent ice damage to docks and piers, boats, boat houses, dams, swimming pools, water intakes, gates, sea walks, bridges, trestles, locks and marinas, to keep harbors and waterways open for navigation, and to maintain open water in logging ponds, stock ponds and tanks, fish rearing ponds and raceways, zoo rookeries, wild bird refuges, and stocked lakes and ponds; and (3) for sewage or industrial waste treatment.

The object of this invention, generally stated is the provision of a method of and apparatus for effecting the distribution or dispersion of liquids in bodies of fluids, especially of air into water, characterized by their simplicity, efficiency, reliability, effectiveness and economy.

An important object of the invention is the provision of such method and apparatus for the purpose of imparting and maintaining controlled circulation rates and patterns in various bodies of water.

A key to the success of the present invention is the flexible weighted tubing utilized to make the direct dispersion or distribution of the fluids into bodies of fluid, and an important object of the invention is the provision of such flexible weighted tubing which is provided with a plurality of outlet valves in the form of relatively short self-closing slits oriented substantially lengthwise of the tubing.

Certain other objects of the invention will, in part, be obvious and will in part appear hereinafter.

For a more complete understanding of the nature and scope of the invention reference may now be had to the following detailed description thereof taken in connection with the accompanying drawings wherein:

FIG. 4 is a perspective view with end cross section showing, of a length of flexible weighted tubing forming one embodiment of the invention;

FIGS. 5, 6 and 7 are views similar to FIG. 4 of somewhat different forms of the flexible, weighted tubing;

FIG. 8 is a diagrammatic sectional view illustrating the flexible, weighted tubing of FIG. 4 partially entering the soft bottom of a body of water;

FIG. 9 is a view similar to FIG. 8 showing the flexible, weighted tubing buried in the bottom to a greater depth;

FIG. 10 is a perspective view of a short length of the weighted flexible tubing showing the outlet valves therein in closed condition;

FIG. 11 is a view corresponding to FIG. 10 showing the valves in their distended or open condition;

FIG. 12 is a perspective view similar to FIG. 10 of a flexible, weighted tubing having a modified form of an outlet valve;

FIG. 13 is a view corresponding to FIG. 12 showing the outlet valves distended or open;

FIG. 14 is a perspective view of a short length of flexible weighted tubing having wedge shaped check-valves in closed position, and formed by converging pairs of parallel slits; and, FIGS. 15, 16 and 17 are views similar to FIG. 14 wherein the pairs of slits have differing conformations or outlines.

Figure 1:
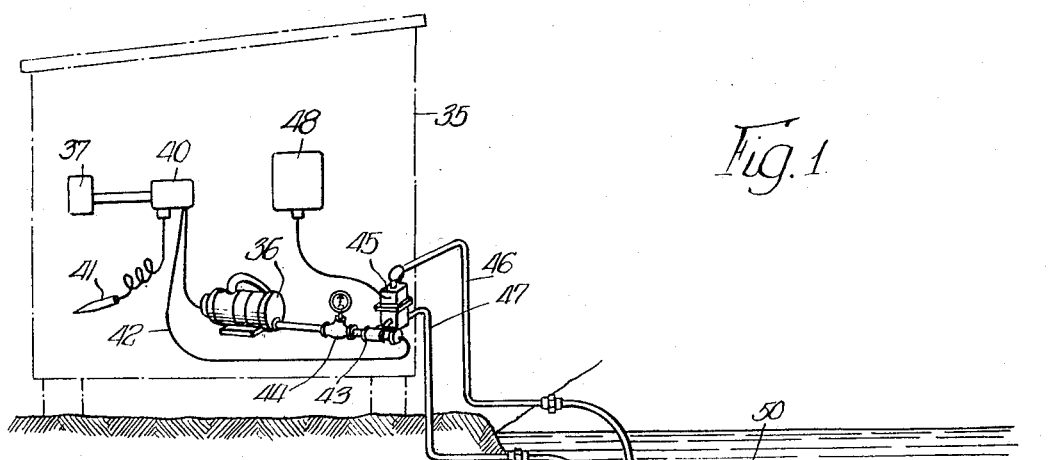
FIG. 1 is a diagrammatic drawing of an automatic, thermostatically controlled, aeration system of the type that would be used for melting ice on a body of water.

Except for the flexible weighted tube with die-formed check valves, the other components of the apparatus and systems employed to practice the invention may be known or conventional: Accordingly, the flexible, weighted tubing will first be described before the various installations or systems making use thereof are discussed. Referring to FIG. 4, the flexible weighted tubing is indicated at 8 it being understood that this can come in any desired length, and which, for convenience in handling, will ordinarily be coiled or reeled until installed. The flexible weighted tubing 8 comprises a length of tubing 10 formed of any suitable rubber-like material including natural or synthetic rubber, polyethylene, polypropylene, vinyl chloride, polystyrene, methylmethacrylate, and various other polymers and co-polymers, and mixtures thereof. Polyethylene tubing constitutes a presently preferred form of the tubing 10 since it has a number of desirable characteristics which make it useful for this invention. All of the various types and forms of tubing that may be used are generically referred to as being formed from resilient, rubber-like materials. While the size of the tubing 10 is not critical within fairly broad limits, the most useful range for purposes of the present invention will be from as small as ¼ inch I.D. up to as large as 2 inches I.D. The wall thickness of the smaller size may range from .01 inch to .07 inch while the wall thickness of the larger size may range from .05 to .2 inch.

Since the flexible tubing must be submerged in use it has to be weighted and for this purpose it is provided with an elongated wire-like weight of dense material, indicated at 11. Because of its high density, flexibility throughout a wide range of temperatures, and durability, lead constitutes a preferred material for forming the wire-like weight 11.

It will be noted that the wire weight 11 extends in a straight line along the tubing 10 when the latter is extended in a straight line. This is important since the weight 11 in use will be at the bottom and constitute a keel which serves to keep the tubing upright and oriented during and after installation. The wire weight 11 may be attached to the tubing 10 in various ways, and in FIG. 4 it is shown permanently attached thereto by an outer coating or sheath of flexible plastic coating indicated at 12. It will be seen that this sheathing or coating completely surrounds both the flexible tubing 10 and the wire weight 11. The assembly shown in FIG. 4 may be formed in a continuous manner at low cost by simply extruding the coating 12 over the flexible tubing 10 and wire 11 as the two are drawn through aligning or orienting openings in a suitable die-block. Both the tubing 10 and the wire 11 may be played off separate reels and after being drawn through the die-block and receiving the coating 12, the resulting assembly may be re-wound on one reel.

In FIG. 5, a length of weighted, flexible tubing is indicated generally at 13 wherein the main flexible tubing 14 is integrally molded or formed in a continuous extrusion process with a smaller envelope 15 which encases the lead wire 16.

In FIG. 6 a further modified form of the weighted tubing is indicated at 17 wherein the flexible tubing 18 is provided with an arcuate ribbing 20 at the bottom for receiving the lead wire 21, this being secured thereto by a water resistant flexible adhesive.

Still another form of flexible tubing is indicated at 22 in FIG. 7. In this embodiment there is a separate flexible conduit or tube 23 while a lead wire 24 is encased in a separate sheathing 26 which is secured to the underside of tube 23 by means of a suitable adhesive or by heat sealing.

It will be appreciated that for a given sized flexible tubing, there may be a variation in the weight of the attached weight wire, as desired. Thus, where the weighted, flexible conduit is submerged in a relatively quiet body of water such as a lake or pond, it is only necessary that the weight provided be sufficient to retain the tubing on the bottom when it is filled with air or other fluid. However, if the submerged weighted conduit is laid in the bottom of a stream or river, it may be necessary to have a heavier weight which will hold the flexible, weighted conduit more firmly down and perhaps even partially bury it in the bottom. In FIG. 8 a condition is illustrated wherein the tubing is subjected to little or no current, while in FIG. 9 a condition is illustrated wherein to resist strong shifting currents the tubing is in a semi-buried condition due to the use of a heavier gauge lead wire than in FIG. 8.

The weight wires in addition to serving to hold down the flexible tubing also serves to lend semi-rigidity thereto so that as the tubing is laid across rocks on, and pockets in, the bottom, it does not collapse, but tends to continue in a straight line with departures therefrom being in the form of sweeping curves.

An important feature of the invention is the provision of the flexible, weighted tubing in its various forms with a plurality of fluid outlet valves formed in the top side thereof opposite the weighted bottom side, with the valves being in the form of relatively short, self-closing slits extending substantially lengthwise of the tubing. Referring now to FIGS. 10 and 11, the length of weighted tubing therein indicated at 30 is provided along the top with a plurality of longitudinal slits 31—31. These slits extend completely through the side wall of the flexible tubing and are oriented longitudinally thereof. The slits 31 it will be seen are substantially perpendicular to a plane tangent to the tubing. That is, they extend in a substantially true radial direction. By reason of the natural resiliency of the tubing the slit valves 31 will normally be closed, and they will remain closed until appreciable differential pressure is exerted on the fluid on the interior.

Obviously, the longer slits 31 are, the larger will be the orifice or valve openings provided thereby, and larger bubbles will be allowed to escape therethrough. For example, with flexible polyethylene tubing having an I.D. of ½ inch and a wall thickness of 0.03 to 0.045 inch, or having an I.D. of 1 inch and a wall thickness of 0.05 to 0.07 inch, the slits 31 will desirably range from as short as 0.05 inch to as long as 0.2 inch. It will be obvious that there can be considerable variation in the spacing between adjacent slit valves 31 (e.g. from ⅛ inch to 10 feet) and the lengths of the slit valves in the same piece of the flexible tubing may vary so that bubbles of different sizes are simultaneously discharged.

Preferably the flexible tubing is selected of a material such that a certain minimum differential pressure is required on the interior of the tubing before the slit valves open, and then once this differential pressure has been reached they will open readily to their normal size without opening further except upon a substantial increase in pressure. Accordingly, the weighted, flexible tubing can be laid in substantial lengths at varying depths, and even though there may be an appreciable pressure drop along the tubing, still the slit valves will all be open and discharging approximately the same sized bubbles. As seen in FIG. 11 the slit valves are small compared with the interior volume of the tubing so that it serves as a header and variations in pressure throughout the length of the tubing tend to be minimized.

When there is no internal pressure, or insufficient pressure within the flexible tubing 30 to open the slit valves 31, the resiliency of the tubing material is such that the valves are pinched or drawn tighter at their outer edges than at their inner edges. It will be apparent that the slits are suitably formed as by dies, so that they have no appreciable thickness.

One of the highly desirable features of the slit valves for release of air or the like, into water is the ability to control accurately the rate of flow through the slit valves over a wide range. For example, with small check valves of the slit type, as little as 0.001 cubic feet per minute of air may be dispersed in bubble sizes ranging from as little as 1/64 of an inch to ⅛ of an inch in diameter. On the other hand, with larger slit check valves, up to 0.5 cubic foot per minute of air may be dispersed in bubble sizes ranging from ¼ to 1 inch. Obviously, valves of the slit type may be provided in any sizes intermediate these small and large sizes.

The size of the bubbles is extremely important both from the standpoint of the rise rate thereof and the efficiency with which the dispersed gas is dissolved in the body of liquid. For example, bubbles which are only 1/64 of an inch in diameter have a rise rate of 1.8 inch per second; ¼ inch bubbles have a rise rate of 18 inches per second; while ½ inch bubbles have a rise rate in excess of two feet per second.

The rise rate, however, is only one of two important factors since if a given volume of air is dispersed as 1/64 inch bubbles on the one hand, and as ¼ inch bubbles on the other, the smaller bubbles will have surface area 16 times greater than the ¼ inch bubbles. Accordingly, taking into consideration the difference in surface areas, the difference in rise rate, the 1/64 inch bubbles will have 160 times as much chance to dissolve in the water as the ¼ inch bubbles, rate of dissolution being proportional to surface area and time of exposure.

There is still another consideration with regard to the bubble size and that is the type of flow that is produced. Bubbles under ⅛ of an inch diameter will have a laminar upward flow. That is the bubbles tend to rise straight up with a minimum of spreading. On the other hand, bubbles larger than ⅛ of an inch in diameter tend to have non-laminar, spiral flow. That is, they tend to rise in spirals which get larger and generally have the shape of an inverted cone. Laminar flow is generally preferred because of the increased water lifting effect created thereby as will be described below.

The control of the bubble size, along with a change in the density of the liquid, gives a fine control of the circulation rate of the liquid. This controlled, upward circulation of the liquid, either laminar or turbulent flow in any desired pattern, is one of the most important features of the invention.

While it is generally preferred that the slit valves be located in the uppermost part of the flexible, weighted tubing, i.e. along the crest thereof, satisfactory results can be obtained with the slits lying as much as 90° to either side of the zenith. However, if the slits are located further over on the sides of the flexible tubing or on the underside thereof, as individual bubbles are released they immediately coalesce and form into large bubbles so that small size, discrete bubbles cannot be obtained, and control of the bubble size is lost. It will be seen that when the slits are all in alignment at the crest, then less care and precision are required in the installation than if the slits lie in part over toward the sides.

In certain instances there may be some advantage in having the slit valves formed or die-cut through the tubing wall on an angle rather than in a true radial direction. A series of slit valves of this type are shown closed in FIG. 12 and open in FIG. 13 wherein the length of tubing is indicated at 32 and the slit valves are designated at 33—33. By forming the slit valves on an angle or bias the effect of greater wall thickness is simulated. Greater pressure is required to open this type of valve, giving better control of bubble size where excess pressure drop or variation in depth of water occur.

For general aeration purposes excellent results have been obtained by using polyethylene tubing having a density of 0.917, a melt-index of 0.2, an elasticity of 3–4% before deformation, an I.D. of 1 inch and a wall thickness of 0.05 to 0.07 inch. The die formed slits in such tubing may range in length from 0.05 to 0.2 inch. Another practical size of the same type polyethylene tubing is one having an I.D. of ½ inch and wall thicknesses from 0.03 to 0.045 inch, in which case the slit may also be in the range of 0.05 to 0.2 inch. The spacing of the slit valves along such tubing may vary from ⅛ of an inch to 10 feet depending on the purpose for which it is used. For ½ inch I.D. tubing, ⅛ inch or larger lead wire may be used, while for 1 inch I.D. tubing ½ inch or larger lead wire is suitable.

One of the desirable characteristics of the flexible, weighed tubing with the type of slit valves described is the fact that these valves are inherently self-closing and self-cleaning. Actually, if it were necessary to use rigid tubing such as metal tubing, the holes would have to be drilled with extremely fine drills such as a No. 80 drill which would give 0.013 inch diameter hole and produce ¼ to ½ inch bubbles. As a practical matter, such holes in tubing cannot be kept free and open since they become readily clogged both from the inside and outside thereby being impractical for submerged use in natural bodies of water.

FIG. 1 shows an installation in accordance with the present invention designed for ice melting with automatic operation. There is indicated at 35 a simple, weather-proof structure which serves to house an oil-less air compressor 36 of known type having a self-contained electric motor adapted to be energized by a suitable source of A.C. or D.C. current, e.g. a 115 volt A.C. current source indicated at 37. The enclosure 35 may be located on shore, on a pier, etc. In this type of compressor no oil whatsoever is allowed to come in contact with the air that is compressed and discharged. This is an important feature when air is dispersed into water and maximum dissolution efficiency is desired. Even if there is only a trace of oil entrained with the air it will form films of light-band thickness on the air bubbles and seriously interfere with their normal rate of dissolution in the water.

The circuit for motor 36 includes a thermostatically controlled switch 40 having a temperature sensing element 41 located on the exterior of the building 35, preferably where it will not be exposed to the sun. One of the leads 42 to the motor 36 is connected in parallel with an electrical heater unit 43 mounted in a fitting 44 through which the compressed air discharges. This heater is provided so as to prevent frost or ice formation in the air discharge. Connected in parallel circuit relationship with the motor 36 for simultaneous energization therewith is a three-way solenoid valve 45 of known type. In the installation shown this valve is in the off-position and discharges into line 47 when the valve is de-energized, and when energized it discharges into line 46. Included in series circuit with the solenoid valve 45 is a clock timer switch 48 of known type which controls the length of time the solenoid valve 45 is in each alternate on position.

The feeder tubes 46 and 47 may if desired be plastic tubing of the flexible, weighted type so as to remain submerged below the water level, but will contain no slits or outlet valves. However, the feeder tubes 46 and 47, or portions of them, may be formed of stainless steel or other non-scaling or non-spalding materials. Preferably, the feeder tubes will be buried or located below the front line for the greater part of their lengths. Connected with each of the feeder tubes 46 and 47 is a length of weighted, flexible tubing 50 and 51 respectively which may take any one of the forms described in connection with FIGS. 4–13. The lengths of tubing 50 and 51 would be laid along the bottom of a pond, lake, or other body of water in a pattern which conforms to the surface area which it is desired to maintain an open spot free of ice. For example, the pattern could be the outline of a boat dock or the water line of a boat in wet storage.

In operation, when the outside temperatures fall below freezing, the thermostat control 40 will energize the installation so that with the compressor 36 running, oil-free, compressed air will be discharged from the compressor through the heated fitting 44, into the solenoid valve 45. The valve 45 will direct the compressed air, alternately first to one feeder tube 46 and then the other feeder tube 47. As the air is alternately discharged through the lengths of tubing 50 and 51 (which are merely representative of any desired number of these lengths of tubing depending on the size of the particular installation) the air rises in small bubbles under ⅛ inch in diameter so that upward laminar flow is produced. The air dissolves at least in part in the water making it substantially less dense or lighter, and the water rises more or less as a narrow elongated column or curtain between opposite walls of cold water. The water rises in part because it has been rendered less dense and in part by reason of the lifting action of the entrained air bubbles.

It is well known that natural bodies of water stratify into thermocline layers having different temperatures. Water has its greatest density at 39.2° F. (4° C.) and there usually will be a strata of water adjacent the bottom with a temperature of approximately that value. The curtain of rising air-bubbles will dissolve in the water and cause it to rise as mentioned. The warm water from adjacent the relatively warm bottom of the body of water will provide the maximum available temperature differential with respect to the surface water temperature of 32° F. and thereby readily melt ice at the surface or prevent it from forming. The laminar upward flow of the warm, bottom water, with a minimum of mixing with the colder upper layers, provides maximum temperature differential to melt ice while conserving heat for maximum ice melting.

It has been found that usually it is only necessary to melt an outline of the ice corresponding to the periphery of area which it is desired to keep clear and free of ice. This action is analogous to simply cutting a narrow channel in the ice so as to define the desired surface area. The wind and wave action will normally do the rest. Thus, a free, floating sheet of ice normally doesn't last long even in very cold temperatures.

It will now become apparent why installations according to my invention are so efficient in comparison with conventional ice melting installations wherein the concept has been to obtain maximum agitation of large volumes of water. First, by producing confined laminar flow I am able to bring up to the surface the warmest available water without its becoming mixed with the colder water and thereby greatly reducing the available temperature differential. Second, by lifting only relatively small volumes of water for the amount of ice melted I conserve as much as possible the available heat supply in the bottom and the water adjacent thereto. Third, by melting only a narrow outline of ice, I utilize the natural wind and wave action to destroy the inner ice formation. Under favorable conditions of deep water and warm bottom water, only one-half horse power is required for each 1,000 feet of submerged flexible weighted tubing with slit valves. Accordingly, two horse power is adequate to melt a square area having 1,000 feet on each side and encompassing over twenty acres.

Figure 2:
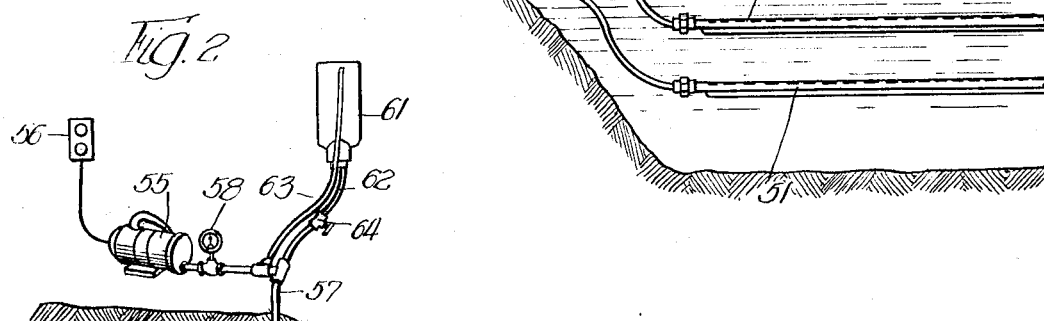
FIG. 2 is a diagrammatic drawing of a manually controlled aeration system for a body of water with provision for introducing minor amounts of a treating agent along with the air being dispersed or distributed.

In FIG. 2 an installation is shown which may be used under manual control for dispersing air into a body of water for purposes of aeration so as to promote or effect water purification, ice melting, disperse air and chemicals into water for weed control, etc. An oil-less air compressor 55 is shown connected for energization with an electrical outlet 56, and for discharging compressed air into a feeder pipe 57 provided with a pressure gauge 58. The feeder line 11 is desirably buried underground so as to come out at a submerged depth below the frost line, as shown. It then connects with the flexible, weighted tubing with slit valves, which in this instance is shown connected into a continuous or endless loop 60. Liquid or gas chemical (e.g. weed-killer or gaseous ammonia for fertilization) is bled into the feeder line 57 from a feeder bottle 61 the outlet of which is connected to the line 57 by means of a length of small diameter tubing 62 with a second length of tubing 63 serving to admit air into the raised end of the bottle. The rate of feed of the chemical is controlled by adjusting an ordinary pinch clamp 64 on one of the tubings 62 or 63.

Figure 3:
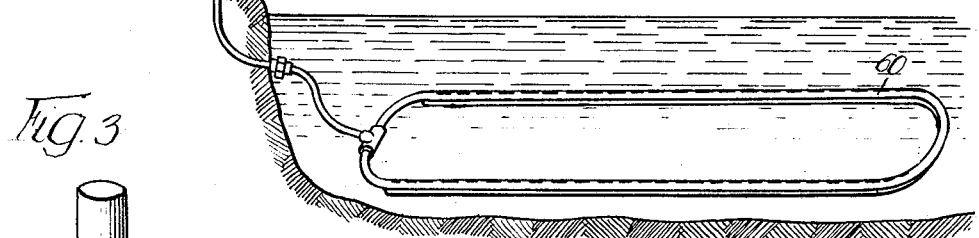
FIG. 3 is a diagrammatic drawing of an aeration system for a large area or body of water.

In FIG. 3 a further installation is shown of the type which is suited for aeration of a large open sewage treatment pond, for water purification by addition of air and turning over large volumes of water, or for ice melting. In this installation there is a relatively large oil-less air compressor 65 driven by an electric motor 66. The compressed air discharge connection of the compressor 65 is connected by means of a plastic, stainless-steel, or other non-corrosive, non-spalding header-line 67 to an elongated distributor or header pipe 68 formed of a similar material. Loops of flexible, weighted tubing 70, 71 and 72 with slit valves are connected to the distributor header 68.

It will be understood that the foregoing installations shown and described in connection with FIGS. 1–3 merely illustrate a wide variety of installations for the various purposes set forth above. A number of other modifications and different installations will be readily apparent to those who are acquainted with my present invention. It will be seen that the illustrative installations of my invention described above in connection with FIGS. 1–3 are relatively inexpensive from the standpoints of cost of materials, maintenance, and labor for installation. Furthermore, these installations can be made on a temporary basis where desired so that they may be readily removed and installed in other locations. On the other hand, the installations may be left in place for years on end since they require practically no attention.

The flexible, weighted tubing with slit valves therein is readily susceptible of being tailored, as it were, to practically any type of situation. For example, there are a number of variables which can be readily adjusted, either singly or in combination so as to obtain practically any desired characteristics over a wide range. The various plastic materials from which the tubing can be formed are in and of themselves subject to wide modification through composition variations, content of plasticizers, etc. By varying the dimensions as to internal diameter and wall thickness, still other variations and properties can be introduced. Furthermore, by varying the lengths of the slit valves and the spacing thereof, various patterns and sizes of bubbles can readily be obtained. Aside from the oil-less compressors, electrical gear, valves, etc, which are commercially available from numerous sources, the only basic material required for installations of the invention is a supply of a few sizes of tubing and lead wire (both commercially available) and a set of dies for forming the various sizes and types of slits. In practice a particular installation is first evaluated and then the plastic hose for it is made up on a tailored basis at no extra cost simply by using the proper dies and slit pattern.

For a given length slit check valve, the following general relationships have been found to exist. The valves will open more wide if (1) the wall thickness of the tube is decreased, (2) the diameter of the tube is increased, or (3) the tensile strength of the material decreased. If a material of high elastic limit before distortion is used, e.g. nautral rubber, then less control over the rate of opening of the valve is obtained. On the other hand, if a tube with excessive wall thickness is used, internal pressure tends to close the inside lips of the slots, causing irregular valve action.

While slit valves formed by single slits as described above in connection with FIGS. 4–13 are highly satisfactory, it is also possible to combine slits so as to form valves which have generally the same operational characteristics as the single slit valves. Referring to FIG. 14 a length of tubing is indicated at 75 provided on the bottom with a flexible wire weight 76 which will be usually formed of lead as described above. In the top of tube 75 pairs of slits 77–78 are die cut through the wall of the tube. While these slits 77–78 are aligned lengthwise with the tubing 75 the planes of the slits are actually somewhat convergent toward the inside of the tubing. Accordingly, the resultant effect is somewhat like cutting a plug in a watermelon or jack-o-lantern but not completely disconnecting the plug on opposite ends. Hence, when pressure is applied on the interior of the tubing 75 and the differential of the interior pressure over the exterior pressure becomes sufficiently great, each of the resilient plugs formed between the pairs of slits 77–78 will lift slightly thereby permitting the air or other gas to escape in the form of fine, controlled-size bubbles.

In FIGS. 15–17 three modifications of the dual-slit form of valves described in connection with FIG. 14 are shown. Thus in FIG. 15 the tubing 80 has a series of slit valves formed by opposing arcuate shaped slits 81–82. Since the opposite ends of each of the slits 81–82 are close together only a smaller amount of material is left uncut at the ends of the valves in comparison with the valves 77–78 in FIG. 14. Therefore, the valves 81–82 in FIG. 15 tend to have easier opening action and greater sensitivity than valves 77–78 in FIG. 14.

In FIG. 16 the tubing 83 is shown having valves formed by pairs of angular slits 84–85. These give much the same effect as the curved slits in FIG. 15.

In FIG. 17 a length of tubing 86 is shown wherein angular type slits are formed by pairs of intersecting slits 87–88. In this embodiment the slits 87 and 88 merge and intersect so that the pointed end thereof is free to lift while there is a relatively broad base of uncut material at the opposite end of the valves.

It will be appreciated that various other forms and arrangements and patterns of the slit valves may be worked out.

If the depth of water above the tubing is uniform, a thin wall tube with high elasticity is usually desirable since a small change in pressure will open the valves wider and controlled valve action is readily obtained in this matter. On the other hand, where there is a variation in depth, thicker walled tubes with more stiffness are desirable. The stiffer tubes require more initial pressure to open the valves in the first instance, but there will be less variation in bubble size where the pressure on the outside of the tube varies. A stiffer tube is also more desirable in the long runs of tubing where there is a larger pressure difference between the inlet and the end of the tube. This variation can also be compensated for or controlled by varying the sizes of the valves, or by using thicker wall tubing at the inlet end.

Since certain additional changes and modifications may be made without departing from the spirit and scope of the invention, it being understood that the embodiments described above in connection with the accompanying drawings are intended to be interpreted as illustrative and not in a limiting sense.

What is claimed as new is:

1. Flexible weighted tubing for distributing air in liquids comprising, semi-rigid, non-collapsible flexible tubing formed of resilient rubber-like material having an orienting weight in the form of at least one lead wire carried along the underside of said tubing so as to extend in substantially a straight line when said tubing is straightened out, said tubing and said lead wire being secured together in a thin outer sheath of flexible coating material, said tubing having a plurality of fluid outlet valves formed in the upper path thereof and said valves being in the form of self-closing slits.

2. The method of melting ice and maintaining a surface area of a body of water open and free therefrom which comprises, introducing oil-free air from a pressurized source into a submerged length of flexible weighted tubing interconnected with said source and comprising flexible tubing formed of resilient, rubber-like material having an orienting weight in the form of at least one heavy wire carried along the underside of said tubing so as to extend in substantially a straight line when said tubing is straightened out, said tubing having a plurality of fluid outlet valves formed in the top side thereof, said valves being in the form of self-closing slits, the pressure of said source being sufficient to discharge said air through said valves from which it rises as discrete air bubbles, the diameters of the majority of said air bubbles not exceeding approximately ⅛ inch so as to produce upward laminar flow of bottom water to the top.

References Cited by the Examiner

UNITED STATES PATENTS

| | | | |
|---|---|---|---|
| 585,856 | 7/1897 | Swanson | 61—13 |
| 2,417,519 | 3/1947 | Persson et al. | 61—1 |
| 2,682,151 | 6/1954 | Simpson et al. | 61—1 |
| 2,699,117 | 1/1955 | LaPrairie | 61—6 X |
| 2,753,001 | 7/1956 | Page | 239—534 X |
| 2,771,320 | 11/1956 | Korwin | 239—534 X |
| 3,050,750 | 8/1962 | Harrison | 61—1 |
| 3,109,288 | 11/1963 | Gross | 61—1 |

FOREIGN PATENTS

| | | |
|---|---|---|
| 1,211,708 | 10/1959 | France. |
| 886,580 | 8/1953 | Germany. |
| 829,756 | 3/1960 | Great Britain. |
| 830,701 | 3/1960 | Great Britain. |

CHARLES E. O'CONNELL, *Primary Examiner.*

JACOB NACKENOFF, JACOB SHAPIRO, EARL J. WITMER, *Examiners.*